May 13, 1930.  R. T. ANDERSON  1,758,272
PROCESS FOR PRODUCING CEREAL FOODS
Filed Oct. 9, 1926
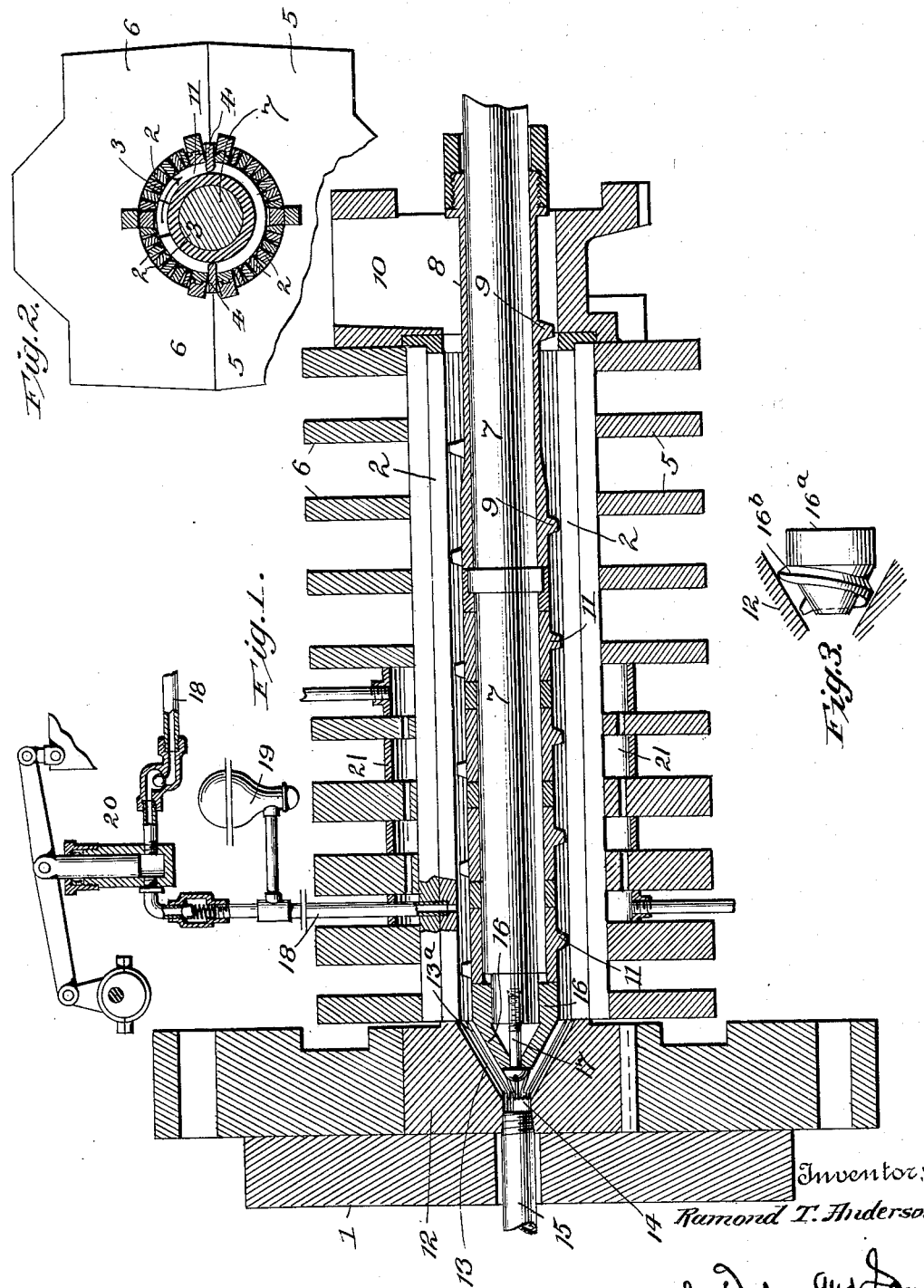

Patented May 13, 1930

1,758,272

UNITED STATES PATENT OFFICE

RAYMOND T. ANDERSON, OF CLEVELAND, OHIO, ASSIGNOR TO THE V. D. ANDERSON COMPANY, OF CLEVELAND, OHIO, A CORPORATION OF OHIO

PROCESS FOR PRODUCING CEREAL FOODS

Application filed October 9, 1926. Serial No. 140,658.

This invention pertains to improved apparatus and method for producing various cooked food products suitable for human and animal consumption.

The invention has for its main object the provision of means whereby an uncooked cereal, for instance flour, may be subjected to pressure with the consequent production of heat and then have added thereto an amount of moisture requisite to produce a cooking action, the material passing from the apparatus in the form of cooked cereal ready for consumption. The material, of course, may be reheated and broken up and utilized the same as an ordinary cooked cereal.

In the annexed drawings I have disclosed an apparatus wherein the operation may be effected though of course it is to be understood that the invention from the process point of view is not limited to the utilization of the particular apparatus shown and hereinafter described.

In said drawings:

Figure 1 is a sectional elevation, partly diagrammatic, of a press designed to subject the cereal to extremely heavy compression and to inject the requisite amount of water into said compressed and heated material with means for discharging the material in one or another mechanical form, Figure 2 is a transverse sectional view of the body or shell of the press, and Figure 3 is a side elevation of a modified form of discharging device.

The press employed to effect the pressure upon the raw material is of a type similar to that shown in Letters Patent to Anderson No. 731,737 dated June 23, 1903, but differs therefrom in that there are no openings formed or left between the bars employed to produce the shell or casing of the press.

In the drawings, 1 denotes the main frame of the press, parts thereof at the right hand end being omitted as are also the gears employed to rotate the shaft hereinafter referred to. The shell is composed of a series of longitudinally disposed bars arranged in substantially circular series as shown in Figure 2. Said bars are denoted by 2 and, as will be seen upon reference to said figure, the inner faces thereof are inclined so that the edges denoted by 3 stand slightly above or inward of the edge of the next adjacent bar thereby producing what may be termed a series of knives extending longitudinally of the barrel. These bars 2 have associated with them a pair of knife bars 4 which extend inwardly of the barrel and which have the effect of preventing rotation of the material as a whole between the various compression screws hereinafter referred to. The various bars are held together by heavy transversely disposed plates or castings 5 and 6 arranged opposite each other in pairs, and plates are in turn held in their assembled relation by suitable tie-rods and bolts (not shown) as is common to the Anderson patent, above referred to, and subsequent patents granted to the same inventor.

Extending into the barrel and throughout the length of the same is a shaft 7 driven through any suitable source of power at the outer or intake end of the press. The shaft forms a support for the quill or sleeve 8 having formed thereon a worm or series of worms 9 adapted to receive the dry material from a hopper 10 and to advance the same forwardly into the shell. This quill may be driven in any suitable manner.

Inwardly of the feed worms the shaft carries a series of separated screws or worms 11, said screws serving to advance the material forwardly through the press and to place it under increasing pressure as in the Anderson patent above referred to.

The outer diameter of the pressing worms or screws 11 is such that they almost touch the bars 2 and the shaft is given a clockwise rotation as indicated by the arrow in Figure 2.

The inwardly projecting knives formed on the bars 4 extend inwardly between the various screws and serve to prevent rotation of the material within the shell of the press to any considerable extent though of course some rotation necessarily takes place.

At the outer end of the shell and mounted within the frame 1 is a block or casting 12 having a tapered opening 13 formed therein with the larger portion of said opening of a side substantially equal to the interior diameter of the shell of the press. The opening extends outwardly in a contracted form as indicated at 14 and is preferably threaded to receive a suitable pipe 15 through which the extruded material is forced. This pipe may have placed in it any suitable die, according to the shape it is desired to impart to the finished product.

Secured to the outer end of the shaft 7 is a frustro-conical member 16, said member being held in place by a machine screw or similar means 17.

In passing through the press the material, say ordinary flour, which may be previously sieved to remove any foreign substance, will be gradually compacted and subjected to considerable friction owing to the action of the feed screw 9 and the worms 11 and to the knife edges 3 of the bars 2. This pressure builds up toward the discharge end of the press where it becomes very high. It is at this point and while the material is under high compression and under high heat, due to friction and compression, that water is introduced. This may be effected in any desired manner and in Figure 1 I have shown, diagrammatically, a pipe 18 opening through one of the bars of the press shell, said pipe being in communication with an accumulator 19 whereby the pressure of the water injected into the highly heated material will be fairly constant. The pipe 18 is also in communication with a suitable pressure pump so constructed and arranged as to bring about a pressure up to 10,000 pounds per square inch although the average pressure employed may be around 5,000 pounds per square inch.

Inasmuch as there is no novelty in the pump mechanism per se, it is merely indicated diagrammatically at 20.

The operation of the press and the carrying out of the process is a continuous one so long as the material is fed to the hopper 10 and the requisite water pressure is maintained.

To recapitulate, the flour, for instance, is drawn into the shell of the press, advanced therethrough by the worms and, as it is advanced, is subjected to an increasing pressure and consequently increasing friction, both of which tend to heat and partially cook the flour. When the compressed and heated mass reaches the water inlet, water is forced into the mass and the mass is immediately steamed, cooking the same, and the cooked material is carried forward and extruded from the press in any desired form. As above noted, the material may be eaten in the form in which it passes from the press. It may be, however, reheated as is common with many prepared cereal foods, before being served. There is no necessity, however, for re-cooking it.

As will be seen upon reference to Figure 1, the frustro-conical opening into which the material is discharged is shown as provided with a series of ribs 13ª, these being present to prevent the cooked and compacted material from rotating with the cone 16 over which it is forced. The presence of such ribs, however, is not essential particularly when treating certain materials.

In Figure 3 I have shown a cone-shaped member 16ª designed to take the place of the plain cone member 16. In this instance the cone is provided upon its tapered face with a screw or flight 16ᵇ. I find, however, that the presence of this screw, which was placed upon the worm with a view of assisting and forcing the material out of the press, is not necessary as the worms 11 force the material outwardly and past the cone 16 without any difficulty whatsoever.

While I have referred to flour specifically in the above description, it is to be understood that the invention is not limited to the cooking or preparation of flour but may be applied generally to various cereals, or other food products, both for human and animal consumption.

The degree of compression obtained in the press, and consequently the temperature range, may, of course, be regulated by increasing or decreasing the pitch and the number of screws employed and also by decreasing or increasing the outlet through which the material is extruded. So too the temperature around the discharge end of the press may be controlled by water jacketing the same in any suitable manner, as indicated by the water chamber 21, Figure 1.

No claim is made herein to the apparatus above set forth, the claims therefor having been withdrawn from this application pursuant to the requirement of division made by the Patent Office.

What is claimed is:

1. That process of producing a food product which consists in subjecting the material to a high degree of mechanical pressure whereby heat is generated therein; and forcing water into the mass while under compression and in its heated condition.

2. That method or preparing cereal foods which consists in subjecting the cereal to a high degree of compression in a confined space and thereby generating heat in the mass; and while the mass is hot and still under pressure, injecting water into the same.

3. That method of producing a cooked food from flour which consists in subjecting flour to a high degree of compression and thereby producing a high degree of heat; and while under compression and still hot, introducing water into the mass.

4. That method of continuously producing a food product from cereal which consists in introducing cereal into a press and subjecting the same therein to pressure with a consequent heating of the mass and forcing water into the mass as it passes through the press in its heated condition.

5. That method of producing a food product which consists in subjecting uncooked material to a high degree of pressure and thereby heating the same and cooking the material, while it is still maintained under pressure and is still hot, by the introduction of water into the mass whereby steam will be generated and the mass cooked thereby.

In testimony whereof I have signed my name to this specification.

RAYMOND T. ANDERSON.